US012786893B2

(12) United States Patent
Gu et al.

(10) Patent No.: US 12,786,893 B2
(45) Date of Patent: Nov. 3, 2026

(54) METHOD AND APPARATUS FOR DETERMINING TIME DOMAIN WINDOW, TERMINAL, AND READABLE STORAGE MEDIUM

(71) Applicant: VIVO MOBILE COMMUNICATION CO., LTD., Guangdong (CN)

(72) Inventors: Yi Gu, Guangdong (CN); Kai Wu, Guangdong (CN); Rongrong Sun, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 319 days.

(21) Appl. No.: 18/738,450

(22) Filed: Jun. 10, 2024

(65) Prior Publication Data

US 2024/0334348 A1 Oct. 3, 2024

Related U.S. Application Data

(63) Continuation of application No. PCT/CN2022/136617, filed on Dec. 5, 2022.

(30) Foreign Application Priority Data

Dec. 10, 2021 (CN) ........................ 202111510022.9

(51) Int. Cl.
*H04W 52/32* (2009.01)
*H04L 5/00* (2006.01)
*H04W 72/0446* (2023.01)

(52) U.S. Cl.
CPC ......... *H04W 52/325* (2013.01); *H04L 5/0035* (2013.01); *H04W 72/0446* (2013.01)

(58) Field of Classification Search
CPC ........... H04W 52/325; H04W 72/0446; H04W 52/14; H04W 52/146; H04W 52/242; H04L 5/0035; H04L 1/08; H04L 5/0085
(Continued)

(56) References Cited

U.S. PATENT DOCUMENTS 11,304,146 B2 * 4/2022 Bae et al. ........... H04W 52/146
2018/0124709 A1 * 5/2018 Seo ..................... H04W 52/325
(Continued)

FOREIGN PATENT DOCUMENTS

CN 113396616 A * 9/2021 ............ H04W 72/23
CN 113543158 A 10/2021
(Continued)

OTHER PUBLICATIONS

Moderator (China Telecom): "[106-e-NR-R17-CovEnh-03] Summary of email discussion on joint channel estimation for PUSCH", 3GPP Draft; R1-2108644, 3rd Generation Partnership Project (3GPP), Mobile Competence Centre; 650, Route Des Lucioles; F-06921 Sophia-Antipolis Cedex; France, vol. RAN WG1, No. e-Meeting; Aug. 16, 2021-Aug. 27, 2021, Sep. 1, 2021 (Sep. 1, 2021), XP052045284.

(Continued)

*Primary Examiner* — Mahendra R Patel

(57) ABSTRACT

An apparatus for determining a time domain window, a terminal, and a readable storage medium. The method for determining a time domain window in embodiments of this application includes: determining, by a terminal, a second time domain window in a first time domain window based on first information. The terminal maintains a first transmission characteristic in the second time domain window for target uplink channel repetitions. The first information includes power control information used for each target uplink channel transmission in the target uplink channel repetitions. The first time domain window is a nominal time domain window configured by a network-side device. The first transmission characteristic is a transmission characteristic with consistent power and continuous phase.

16 Claims, 4 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0176797 | A1* | 6/2021 | Kang | H04B 7/0404 |
| 2021/0266769 | A1* | 8/2021 | Chung | H04L 5/001 |
| 2022/0046696 | A1* | 2/2022 | Park et al. | H04L 1/1819 |
| 2022/0131672 | A1* | 4/2022 | Jang | H04L 5/0053 |

FOREIGN PATENT DOCUMENTS

| | | | | |
|---|---|---|---|---|
| WO | WO-2018203650 | A1 * | 11/2018 | H04L 5/0091 |
| WO | WO-2020198663 | A1 * | 10/2020 | H04W 16/14 |
| WO | WO-2021026910 | A1 * | 2/2021 | H04W 52/04 |
| WO | WO-2022025740 | A1 * | 2/2022 | H04L 5/0012 |

OTHER PUBLICATIONS

Moderator (China Telecom): "FL Summary of joint channel estimation for PUSCH", 3GPP Draft; RI-2111429, 3rd Generation Partnership Project (3GPP), Mobile Competence Centre; 650, Route Des, Lucioles; F-06921 Sophia-Antipolis Cedex; France, vol. RAN WG1, No. e-Meetng; Nov. 11, 2021-Nov. 19, 2021, Nov. 15, 2021 (Nov. 15, 2021), XP052097718.

Moderator (China Telecom): "FL Summary#4 of joint channel estimation for PUSCH", R1-2112563, Nov. 20, 2021 (Nov. 20, 2021), sections 2-5.

Ericsson: "Joint Channel Estimation for PUSCH", 3GPP Draft; R1-2110124, 3rd Generation Partnership Project (3GPP), Mobile Competence Centre; 650, Route Des, Lucioles; F-06921 Sophia-Antipolis Cedex; France, vol. RAN WG1, No. e-Meetng; Oct. 11, 2021-Oct. 19, 2021, Oct. 2, 2021 (Oct. 2, 2021), XP052059060.

Samsung: "Joint channel estimation for PUSCH", 3GPP Draft; R1-2111753, 3rd Generation Partnership Project (3GPP), Mobile Competence Centre; 650, Route Des Lucioles ; F-06921; France, vol. RAN WG1, No. e-Meetng; Nov. 11, 2021-Nov. 19, 2021, Nov. 5, 2021 (Nov. 5, 2021), XP052074314.

Ericsson: "Remaining Issues for Joint Channel Estimation for PUSCH", R1-2112037, Nov. 6, 2021 (Nov. 6, 2021), sections 2-3.

First Office Action dated Apr. 1, 2025 received in corresponding patent family application No. CN202111510022.9. English translation attached.

Extended European Search Report dated Dec. 12, 2024 received in corresponding European Application No. EP22903388.1.

International Search Report dated Dec. 6, 2022 in International Application No. PCT/CN2022/136617. English translation attached.

Written Opinion of the ISA dated Feb. 17, 2023 in International Application No. PCT/CN2022/136617. English translation attached.

* cited by examiner

METHOD AND APPARATUS FOR DETERMINING TIME DOMAIN WINDOW, TERMINAL, AND READABLE STORAGE MEDIUM

CROSS-REFERENCE TO RELATED APPLICATIONS

This application is a continuation of International Application No. PCT/CN2022/136617 filed on Dec. 5, 2022, which claims priority to Chinese Patent Application No. 202111510022.9 filed on Dec. 10, 2021, which are incorporated herein by reference in their entireties.

TECHNICAL FIELD

This application pertains to the field of communication technologies, and specifically relates to a method and an apparatus for determining a time domain window, a terminal, and a readable storage medium.

BACKGROUND

In the technical research on coverage enhancement, consistent power and continuous phase should be guaranteed in physical uplink control channel (PUCCH) repetitions as much as possible to implement joint channel estimation, thereby improving transmission performance. To maintain the continuity of power and phase in PUCCH repetitions, changes in the transmission reception point (TRP) are not expected during the PUCCH repetition process. However, this can lead to PUCCH transmission failures when a PUCCH transmission signal encounters obstacles.

From the above, it is clear that a problem of poor reliability exists in PUCCH repetitions in the coverage enhancement technology.

SUMMARY

Embodiments of this application provide a method and an apparatus for determining a time domain window, a terminal, and a readable storage medium.

According to a first aspect, a method for determining a time domain window is provided, where the method includes:

- determining, by a terminal, a second time domain window in a first time domain window based on first information; where
- the terminal maintains a first transmission characteristic in the second time domain window for target uplink channel repetitions;
- the first information includes power control information used for each target uplink channel transmission in the target uplink channel repetitions;
- the first time domain window is a nominal time domain window configured by a network-side device; and
- the first transmission characteristic is a transmission characteristic with consistent power and continuous phase.

According to a second aspect, an apparatus for determining a time domain window is provided, applied to a terminal, where the apparatus includes:

- a first determining module, configured to determine a second time domain window in a first time domain window based on first information; where
- the terminal maintains a first transmission characteristic in the second time domain window for target uplink channel repetitions;

- the first information includes power control information used for each target uplink channel transmission in the target uplink channel repetitions;
- the first time domain window is a nominal time domain window configured by a network-side device; and
- the first transmission characteristic is a transmission characteristic with consistent power and continuous phase.

According to a third aspect, a terminal is provided, where the terminal includes a processor and a memory, where the memory stores a program or instructions capable of running on the processor, and when the program or instructions are executed by the processor, the steps of the method according to the first aspect are implemented.

According to a fourth aspect, a terminal is provided, including a processor and a communication interface, where the processor is configured to determine a second time domain window in a first time domain window based on first information, where

- the terminal maintains a first transmission characteristic in the second time domain window for target uplink channel repetitions;
- the first information includes power control information used for each target uplink channel transmission in the target uplink channel repetitions;
- the first time domain window is a nominal time domain window configured by a network-side device; and
- the first transmission characteristic is a transmission characteristic with consistent power and continuous phase.

According to a fifth aspect, a readable storage medium is provided, where the readable storage medium stores a program or instructions, and when the program or instructions are executed by a processor, the steps of the method according to the first aspect are implemented.

According to a sixth aspect, a chip is provided, where the chip includes a processor and a communication interface, the communication interface is coupled to the processor, and the processor is configured to run a program or instructions to implement the method according to the first aspect.

According to a seventh aspect, a computer program/program product is provided, where the computer program/program product is stored in a storage medium, and the computer program or program product is executed by at least one processor so as to implement the method for determining a time domain window according to the first aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It is worth noting that the technology described in the embodiments of this application is not limited to long term evolution (LTE)/LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communication system.

Figure 1:
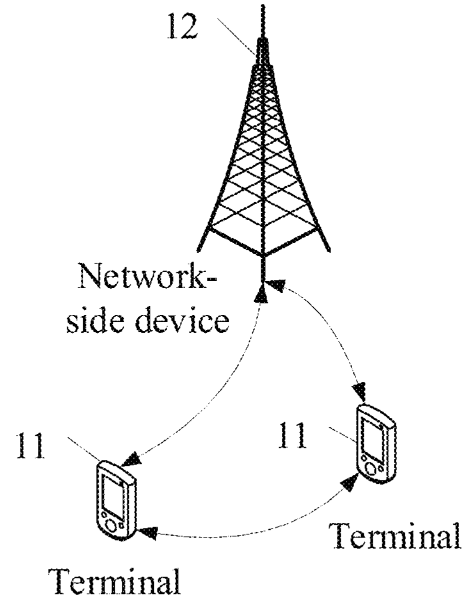
FIG. 1 is a schematic structural diagram of a wireless communication system to which embodiments of this application are applicable.

FIG. 1 is a block diagram of a wireless communication system to which the embodiments of this application are applicable. The wireless communication system includes a terminal 11 and a network-side device 12. The terminal 11 can be a mobile phone, tablet personal computer, laptop computer also known as a notebook computer, personal digital assistant (PDA), palmtop computer, netbook, ultra-mobile personal computer (UMPC), mobile internet device (MID), augmented reality (AR)/virtual reality (VR) device, robots, wearable device, vehicle user equipment (VUE), pedestrian user equipment (PUE), smart home device (wireless communication-enabled home devices such as refrigerators, televisions, washing machines, or furniture), gaming console, personal computer (PC), automated teller machine or self-service machine, or other terminal-side device. Wearable devices include smartwatches, smart bands, smart earphones, smart glasses, smart jewelry (smart bangles, smart bracelets, smart rings, smart necklaces, smart foot bangles, and smart anklets), smart wristbands, smart clothing, and the like. It should be noted that a specific type of the terminal 11 is not limited in the embodiments of this application. The network-side device 12 can include an access network device or core network device, where the access network device can also be referred to as a radio access network device, radio access network (RAN), radio access network function, or radio access network unit. The access network device can include base stations, wireless local area network (WLAN) access points, wireless fidelity (WiFi) nodes, or the like. The base station can be referred to as Node B, evolved Node B (eNB), access point, base transceiver station (BTS), radio base station, radio transceiver, basic service set (BSS), extended service set (ESS), home Node B, home evolved Node B, transmitting receiving point (TRP), or other appropriate terms in the field. As long as the same technical effect is achieved, the base station is not limited to any specific technical terminology. It should be noted that in the embodiments of this application, only the base station in the NR system is introduced as an example, and the specific type of the base station is not limited.

In related art, through the coverage enhancement technology, consistent power and continuous phase should be guaranteed in PUCCH repetitions as much as possible to implement joint channel estimation and thereby improve transmission performance. In the coverage enhancement technology, in order to maintain the power consistency and phase continuity in PUCCH repetitions, it is necessary to prohibit the switching of power control parameters during PUCCH repetitions.

In the embodiments of this application, the terminal can maintain power consistency and phase continuity during multiple PUCCH repetitions. In this way, in a case of reception of the PUCCH repetitions, the network can obtain channel information of other PUCCH repetitions based on a demodulation reference signal (DMRS) of one of the PUCCHs. Subsequently, the network can use the DMRSs in the multiple PUCCHs for joint channel estimation to improve reception performance. This technology is called joint channel estimation, where a time interval in which joint channel estimation can be performed is referred to as a time domain window.

Specifically, a time domain window may be defined as a time interval in which the terminal can perform transmission with phase continuity. Within this interval, the terminal will be subjected to power and phase restriction to maintain power consistency and phase continuity during transmission.

Figure 2:
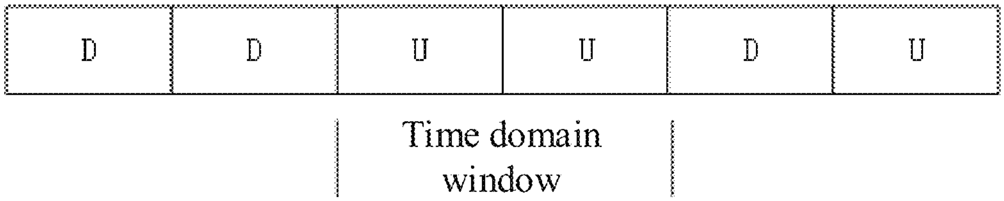
FIG. 2 is a schematic diagram of a time domain window.

For example, as shown in FIG. 2, it is assumed that two consecutive uplink slots (represented by "U" in FIG. 2 where "D" represents downlink slots) are marked within the time domain window. In this case, the uplink transmission in the two uplink slots needs to maintain power consistency and phase continuity. In this way, the uplink transmission in the two uplink slots can be considered to have minimal channel variations, allowing for demodulation through joint channel estimation at the base station side, thereby enhancing performance.

In the embodiments of this application, in PUCCH repetitions, the second time domain window for continuous transmission can be determined based on the power control information of each PUCCH transmission. In this way, after the power control information in the PUCCH repetitions changes, the restarting of the second time domain window for continuous transmission based on the first transmission characteristic is supported. This allows PUCCH repetitions to adapt to occasions where power control information used for PUCCH transmission changes. Thus, the reliability of PUCCH repetitions can be improved through changes in power control information. In addition, this allows for effective utilization of joint channel estimation, thereby enhancing the performance of PUCCH repetition effectively.

It should be noted that in the embodiments of this application, the target uplink channel repetitions may also include physical uplink shared channel (PUSCH) repetitions. The PUSCH repetitions are similar to PUCCH repetitions. For ease of description, in the following embodiments, only the target uplink channel being a PUCCH is used as an example for description, which does not constitute a specific limitation herein.

The following describes in detail the method and apparatus for determining a time domain window, a terminal, and a readable storage medium provided in the embodiments of this application by using some embodiments and application scenarios thereof with reference to the accompanying drawings.

Figure 3:
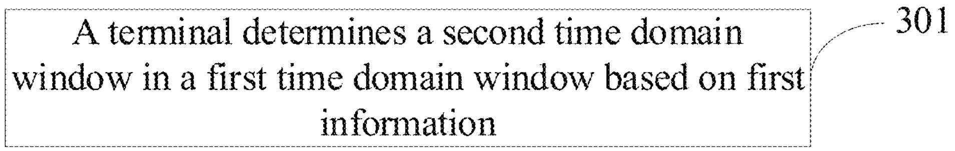
FIG. 3 is a flowchart of a method for determining a time domain window according to an embodiment of this application.

Refer to FIG. 3. The method for determining a time domain window provided in the embodiments of this application may be executed by a terminal. As shown in FIG. 3, the method for determining a time domain window may include the following steps.

Step 301: A terminal determines a second time domain window in a first time domain window based on first information; where the terminal maintains a first transmission characteristic in the second time domain window for target uplink channel repetitions; the first information includes power control information used for each target uplink channel transmission in the target uplink channel repetitions; the first time domain window is a nominal time domain window configured by a network-side device; and the first transmission characteristic is a transmission characteristic with consistent power and continuous phase.

In a specific implementation, the foregoing first time domain window may be understood as a nominal time domain window (that is, nominal time domain window) configured by the network-side device. In other words, the network-side device configures the terminal as capable of performing continuous transmission with consistent power and continuous phase in the first time domain window; or in the first time domain window, the network-side device expects the terminal to maintain consistent power and continuous phase between PUCCH transmissions according to the requirements for power consistency and phase continuity. For ease of description, the first time domain window is referred to as the "configured time domain window" in the following embodiments. In practical applications, some behaviors or indications that can break the power consistency and phase continuity may occur. Such behavior or indication is referred to as a target event. Consequently, in the case that a target event occurs, the terminal cannot continue the continuous transmission based on the previous power control information.

Additionally, the foregoing second time domain window may be understood as a time domain window in which the terminal actually performs continuous transmission (that is, the actual time domain window). For ease of description, the second time domain window is also referred to as the "actual time domain window" in the following embodiments. In an implementation, the first time domain window may include one or at least two second time domain windows, and the terminal can restart the continuous transmission based on different power control information in a different second time domain window. In other words, after starting a second time domain window, the terminal may terminate the second time domain window due to the occurrence of a target event and can subsequently restart a new second time domain window.

It should be noted that the foregoing first transmission characteristic is similar to the continuous transmission characteristic for maintaining consistent power and continuous phase in PUCCH repetitions in the coverage enhancement technology. The difference lies in that in one first time domain window, there may be one or at least two second time domain windows, and different power transmission information can be used in different second time domain windows.

In addition, in a case that the target uplink channel includes the PUCCH channel, the power control information may include at least one of the following:

closed loop power control state value ClosedLoopIndex;

power control state information index p0-PUCCH-Id of the PUCCH channel; and path loss reference signal index PUCCH-PathlossReferenceRS-Id of the PUCCH channel.

Option 1: PUCCH-PathlossReferenceRS-Id

The main function of this value is to indicate, during calculation of the path loss, a mapping index value referring to a corresponding reference signal, to indicate the index of PUCCH-PathlossReferenceRS in different power control parameters corresponding to different power control parameter sets (hereinafter referred to as "PC parameter sets"). Through this index, the UE will determine the type of the referenced signal (for example, synchronization signal/physical broadcast channel signal block (SSB) or channel state information reference signal (CSI-RS)) corresponding to the PC parameter set, and the specific index information of the referenced signal (for example, SSB-Index or CSI-RI resource index). The UE will refer to the corresponding reference signal based on the information to calculate and estimate the downlink path loss value.

Option 2: p0-PUCCH-Id

The main function of this value is to indicate a mapping index value for finding the corresponding power control state parameter information in the case of determining a power control state to be used. It indicates the corresponding index information of different closed-loop power control states (for example, closedLoopIndex) corresponding to different PC parameter sets. Through this index, the terminal will determine whether the specific power control state corresponding to the spatial relationship is 0 or 1.

Option 3: ClosedLoopIndex

The main function of the value is to provide corresponding power control state information. Generally, a PUCCH configured with two PUCCH-PC-AdjustmentStates and a parameter in a PC parameter set has two power control states. The specific power control state to be used depends on the specific indication information in the PC parameter set.

It should be noted that the PC parameter sets for the foregoing options 1 to 3 may include the PC parameter sets of at least one of the foregoing parameters, including but not limited to the spatial relationship parameter PUCCH-SpatialRelationInfo.

In an implementation, the network-side device may configure one, two, or all of the foregoing three power control parameters for the terminal, so as to trigger, based on such power control parameter(s), the terminal to determine the second time domain window. This is not specifically limited herein.

It should be noted that in an implementation, in addition to the foregoing power control information, the first information may also include other information. For example, the first information may also include configuration/instruction information from the network-side device. In other words, the network-side device can trigger the terminal to determine the second time domain window based on an event triggered by semi-static configuration (such as semi-static uplink and downlink frame structure configuration or frequency hopping), and/or dynamic configuration or an instruction (such as medium access control (MAC) control element (CE) signaling or downlink control information (DCI) signaling). This is not specifically limited herein.

In applications, in the first time domain window, a behavior or indication that can break the power consistency and phase continuity may occur. Such behavior or indication is referred to as an event. For different types of events, the handling behavior of the terminal varies. For example, for an event triggered by semi-static configuration (such as semi-static uplink and downlink frame structure configuration or frequency hopping), it is believed that the terminal must restart the second time domain window on a symbol of the 1st PUCCH transmission after the event; for an event triggered by a MAC CE or DCI, it is believed that whether the terminal can restart the second time domain window can depend on the capability of the terminal.

In an optional implementation, the PUCCH repetitions include a first PUCCH transmission and a second PUCCH transmission.

The determining, by a terminal, a second time domain window in a first time domain window based on first information includes:

- in a case that power control information corresponding to the first PUCCH transmission is different from power control information corresponding to the second PUCCH transmission, determining, by the terminal, that a target event has occurred, where the target event means that the terminal is unable to maintain the first transmission characteristic; and
- determining, by the terminal, the second time domain window in the first time domain window based on the occurrence of the target event.

In an implementation, the foregoing first PUCCH transmission and second PUCCH transmission may be two PUCCH transmissions performed by the terminal that are adjacent to each other in time. For example, the terminal may perform the second PUCCH transmission immediately after performing the first PUCCH transmission or after an interval. The first PUCCH transmission and the second PUCCH transmission correspond to different power control information. This can be understood as that the power control information used by the terminal device in performing the first PUCCH transmission is different from the power control information used in performing the second PUCCH transmission.

In some embodiments, in a case that the power control information corresponding to the first PUCCH transmission is different from the power control information corresponding to the second PUCCH transmission, the terminal can determine that a target event causing the inability to maintain the first transmission characteristic has occurred. Thus, the terminal can determine the second time domain window in the first time domain window based on the occurrence of the target event.

The determining, by the terminal, the second time domain window in the first time domain window based on the occurrence of the target event can be understood as: triggering, by the terminal, determination of the second time domain window in the first time domain window based on the occurrence of the target event; or determining, by the terminal, the second time domain window based on the occurrence time of the target event.

The determining, by the terminal, the second time domain window in the first time domain window based on the occurrence time of the target event can be understood as: terminating the current second time domain window at the last symbol of the last PUCCH before the occurrence of the target event; and/or starting a new second time domain window at the 1st symbol of the 1st PUCCH after the occurrence of the target event. In other words, the current second time domain window may include the time during which the first PUCCH transmission is performed, while the started new second time domain window may include the time during which the second PUCCH transmission is performed.

Optionally, the determining, by the terminal, the second time domain window in the first time domain window includes at least one of the following:

- determining, by the terminal, to close the second time domain window corresponding to the first target uplink channel transmission; and
- determining, by the terminal, to start the second time domain window corresponding to the second target uplink channel transmission; or determining, by the terminal, not to start a new second time domain window in the first time domain window.

Case 1

The terminal can close the second time domain window corresponding to the first target uplink channel transmission after performing the first target uplink channel transmission; close the current second time domain window before performing the second PUCCH transmission; or immediately close the current second time domain window after performing the first PUCCH transmission, where the second time domain window corresponding to the first target uplink channel transmission may be understood as: performing continuous transmission with power consistency and phase continuity for at least one uplink channel transmission, including the first target uplink channel transmission in the second time window.

In this case, the following situation can be avoided: in the face of problems such as blocking, the transmission performance of the second PUCCH is low or even the transmission fails when the second PUCCH is transmitted based on the power and phase used for the first PUCCH transmission. In other words, the reliability of the second PUCCH transmission can be improved.

Case 2

The terminal can start the second time domain window corresponding to the second target uplink channel transmission after closing the second time domain window corresponding to the first target uplink channel transmission, that is, after terminating the continuous transmission performed based on the first transmission characteristic, the terminal can restart continuous transmission based on the power control information used after the target event. The second time domain window corresponding to the second target uplink channel transmission may be understood as: in this second time domain window, performing continuous transmission with power consistency and phase continuity for at least one uplink channel transmission, including the second target uplink channel transmission.

Figure 4:
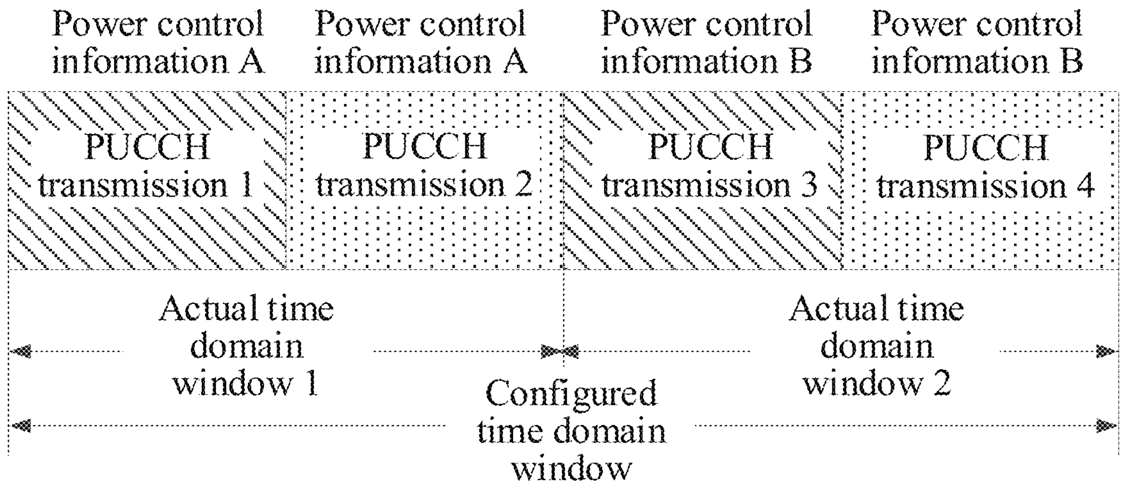
FIG. 4 is a first schematic diagram of a time domain window according to an embodiment of this application.
Figure 5:
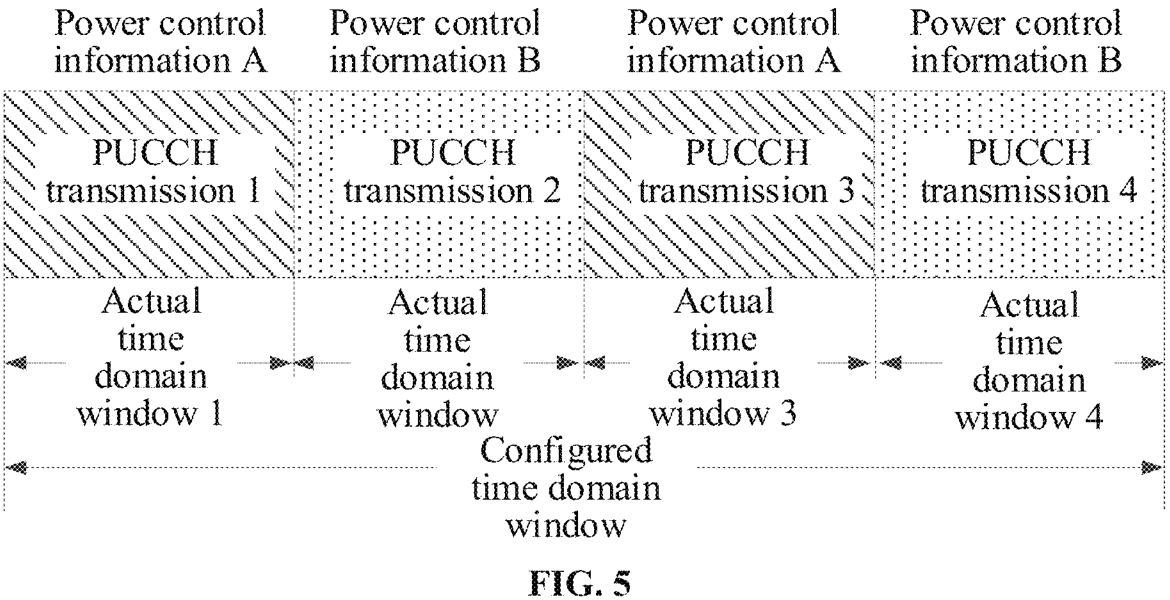
FIG. 5 is a second schematic diagram of a time domain window according to an embodiment of this application.

For example, as shown in FIG. 4 or FIG. 5, the terminal device can restart actual time domain window 2 after terminating actual time domain window 1, or even restart actual time domain window 3 after terminating actual time domain window 2, and so on until the first time domain window terminates or the PUCCH transmission reaches the last symbol of the last PUCCH.

In this case, the second time domain window corresponding to the second target uplink channel transmission is started after the second time domain window corresponding to the first target uplink channel transmission is closed, so that continuous transmission can be performed based on the power control information of the second PUCCH after the continuous transmission is terminated. This allows the second PUCCH transmission and other PUCCH transmissions in the new second time domain window to adapt to joint channel estimation to enhance transmission performance.

Case 3

The terminal can no longer start a new second time domain window after closing the second time domain window corresponding to the first target uplink channel transmission, that is, after terminating the continuous transmission performed based on the first transmission characteristic, the terminal cannot restart continuous transmission based on the power control information used after the target event.

Figure 6:
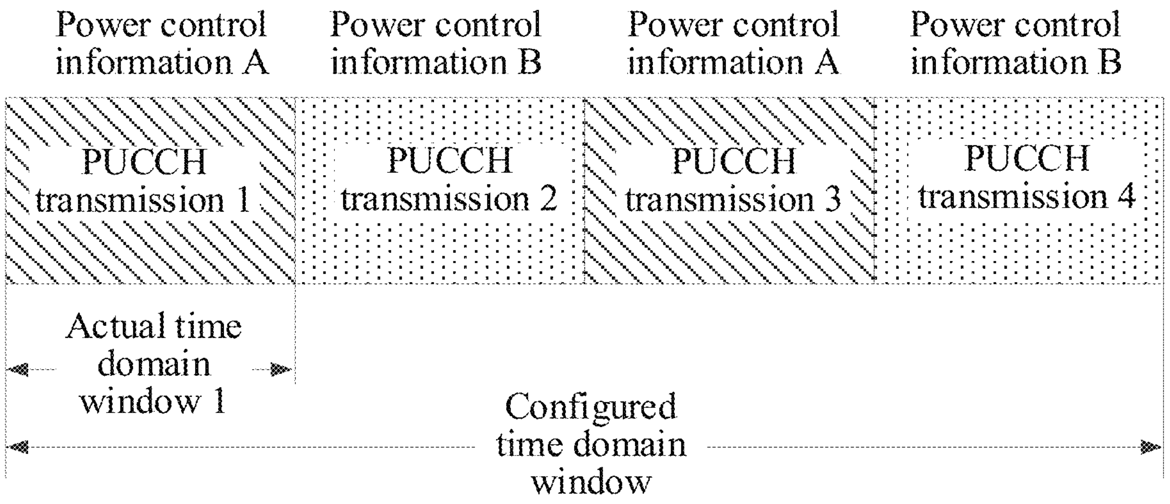
FIG. 6 is a third schematic diagram of a time domain window according to an embodiment of this application.

For example, as shown in FIG. 6, after terminating the actual time domain window 1, the terminal device does not start a new actual time domain window until the first time domain window terminates.

In this case, after closing the current second time domain window, the terminal does not start a new second time domain window, so that subsequent continuous transmissions can be dropped, so as to reduce the signaling overheads and resource occupation for continuous transmission.

In an implementation, whether the terminal can start a new actual time domain window after terminating an actual time domain window can be based on the capability information of the terminal and/or the type of target event.

In an optional implementation, the determining, by the terminal, to start the second time domain window corresponding to the second target uplink channel transmission; or determining, by the terminal, not to start a new second time domain window in the first time domain window includes:

- in a case that capability information of the terminal supports starting a new time domain window and/or the terminal has received first radio resource control (RRC) signaling, closing, by the terminal, the second time domain window corresponding to the first target uplink channel transmission, and starting a new second time domain window at a position of the 1st symbol of the 1 st target uplink channel transmission following the occurrence of the target event, where the first RRC signaling is used to enable the terminal to start a new time domain window;
- in a case that capability information of the terminal does not support starting a new time domain window and/or the terminal has received second RRC signaling, closing, by the terminal, the second time domain window corresponding to the first target uplink channel transmission, and skipping starting a new second time domain window in the first time domain window, where the second RRC signaling is used to disable the terminal from restarting a new time domain window;
- closing, by the terminal, the second time domain window corresponding to the first target uplink channel transmission, and starting a new second time domain window at a position of the 1st symbol of the 1st target uplink channel transmission following the occurrence of the target event; or
- closing, by the terminal, the second time domain window corresponding to the first target uplink channel transmission, and skipping starting a new second time domain window in the first time domain window.

Embodiment 1

In a case that capability information of the terminal supports starting a new time domain window and/or the terminal has received first signaling, the terminal closes the second time domain window corresponding to the first target uplink channel transmission, and starts a new second time domain window at a position of the 1st symbol of the 1st target uplink channel transmission following the occurrence of the target event, where the first signaling is used to enable the terminal to start a new time domain window.

In an implementation, the terminal can report its capability information to the network-side device. For example, the capability information includes the maximum duration for which the terminal can maintain power consistency and phase continuity according to power consistency and phase continuity requirements. This allows the network-side device to determine, based on the capability information of the terminal, whether the terminal supports starting a new time domain window, and then perform PUCCH-related configuration according to the determination result, so as to enable or disable the terminal to start a new time domain window.

For example, in a case that the capability of the terminal supports restarting a time domain window, through first signaling (for example, PUCCH restart time domain window signaling (PUCCH-Window-Restart)), the network-side device enables the terminal to start a new time domain window after closing the previous time domain window, where the first signaling may be RRC signaling or other types of signaling such as media access control control element MAC CE signaling or downlink control information DCI signaling. This is not specifically limited herein.

Certainly, in specific implementations, the network-side device may also determine, based on information other than the capability information reported by the terminal, whether to enable or disable the terminal to start a new time domain window; or the network-side device may obtain the capability information of the terminal in other ways, and determine, based on the capability information of the terminal, whether to enable or disable the terminal to start a new time domain window; or in a case that the terminal determines that its own capability information supports starting a new time domain window, the terminal directly restarts a new second time domain window after closing the current second time domain window.

In this embodiment, the target event may be a dynamic event triggered dynamically (for example, triggered by MAC CE signaling or DCI signaling transmitted by the network-side device), and whether the terminal can restart a second time domain window after terminating continuous transmission based on that dynamic event depends on the capability of the terminal. In other words, if the terminal supports starting a new time domain window, the network-side device can enable the terminal to start a new second time domain window at the position of the 1st symbol of the 1st target uplink channel transmission after closing the current second time domain window.

Embodiment 2

In a case that capability information of the terminal does not support starting a new time domain window and/or the terminal has received second RRC signaling, the terminal closes the second time domain window corresponding to the first target uplink channel transmission, and does not start a new second time domain window in the first time domain window, where the second RRC signaling is used to disable the terminal from restarting a new time domain window.

Corresponding to the foregoing embodiment 1, in this embodiment, in a case that the terminal does not support starting a new time domain window, the network-side device can disable the terminal from starting a new second time domain window after closing the current second time domain window.

Embodiment 3

The terminal closes the second time domain window corresponding to the first target uplink channel transmission, and starts a new second time domain window at the position of the 1st symbol of the 1st target uplink channel transmission following the occurrence of the target event.

In this embodiment, the target event may be a semi-static event triggered semi-statically (for example, triggered by actions such as semi-static uplink and downlink frame structure configuration and frequency hopping). In this case, triggered by the semi-static event, the terminal needs to start the second time domain window corresponding to the second target uplink channel transmission after closing the second time domain window corresponding to the first target uplink channel transmission.

Embodiment 4

The terminal closes the second time domain window corresponding to the first target uplink channel transmission, and does not start a new second time domain window in the first time domain window.

In this embodiment, in a case that the current second time domain window is closed, the terminal directly abandons maintaining the transmission with the first characteristic, so that the terminal does not start a new second time domain window in the first time domain window. This can reduce the signaling overheads and resource consumption required for starting a new second time domain window.

In some embodiments, before the determining, by a terminal, a second time domain window in a first time domain window based on first information, the method further includes:

receiving, by the terminal, third signaling, where the third signaling is used to configure or indicate a target PUCCH resource and at least two pieces of power control information.

In specific implementations, the third signaling may include at least one of the following: RRC signaling, media access control control element MAC CE signaling, and downlink control information DCI signaling; or the third signaling may be other signaling from the network-side device. This is not specifically limited herein.

For example, every time one PUCCH resource is activated in frequency range (FR) 2, the identification of the PUCCH resource (PUCCH resource ID) is determined. In addition, the identifications (ID) of two pieces of spatial relation information (spatial Relation Info) can also be determined, where the ID of each piece of spatial Relation Info corresponds to a set of different beams and power control information.

Certainly, for FR1, the way of configuring or indicating the target PUCCH resource and at least two pieces of power control information is similar to the way of configuring the target PUCCH resource and at least two pieces of power control information in the foregoing FR2, except that the ID of power control information, such as the ID of Power Control Setting, is determined instead of the ID of spatial Relation Info. Details are not described herein.

In this embodiment, through the third signaling, the network-side device can configure the terminal to perform PUCCH repetitions on the target PUCCH resource, and at least two pieces of power control information can be used in the PUCCH repetitions, where the first information includes the at least two pieces of power control information. In other words, different PUCCH transmissions in the PUCCH repetitions can use different power control information, thereby implementing power control information switching in the PUCCH repetitions.

It should be noted that the difference in PUCCH repetitions between the embodiments of this application and the general coverage enhancement scenarios is as follows:

In the general coverage enhancement scenarios, the transmission power of PUCCH repetitions cannot be changed. The following formula is an expression for calculating the power of a PUCCH. The most likely way to change the power is by modifying the item $\delta_{PUCCH,b,f,c}(i,l)$ in the following formula by using a group common transmit power control (TPC) command. The remaining items are pre-configured and will not change. However, restricted by the stipulation in the existing conclusion that TPC power accumulation commands do not take effect within a time domain window, $\delta_{PUCCH,b,f,c}(i,l)$ will change only after the time domain window ends. Therefore, in general coverage enhancement scenarios, the PUCCH power cannot change in the time domain window of PUCCH repetitions.

$$P_{PUCCH,b,f,c}(i, q_u, q_d, l) = \min\begin{cases} A_1 \\ A_2 \end{cases};$$

$$A_1 = P_{CMAX,f,c}(i); \text{ and}$$

$$A_2 = P_{O_{PUCCH},b,f,c}(q_u) + 10\log\left(2^{u}.M_{PB,b,f,c}^{PUCCH}(i)\right) + PL_{b,f,c}(q_d) + \Delta_{F_{PUCCH}}(F) + \Delta_{TF,b,f,c}(i) + g_{b,f,c}(i, l); \text{ where}$$

$P_{PUCCH,b,f,c}(i,q_u,q_d,l)$ represents the transmission power of the PUCCH; $P_{CMAX,f,c}(i)$ represents the maximum transmit power that can be configured for the terminal; $P_{O\_PUCCH,b,f,c}(q_u)$ represents the sum of several basic transmit powers of the PUCCH; μ represents a coefficient related to subcarrier spacing (SCS);

$$M_{RB,b,f,c}^{PUCCH}(i)$$

represents a parameter related to the number of resource blocks (RB) occupied by the PUCCH; $PL_{b,f,c}(q_d)$ represents an estimated value of downlink path loss; $\Delta_{F_{PUCCH}}(F)$ represents the power adjustment amount determined based on different PUCCH formats; $\Delta_{TF,b,f,c}(i)$ represents the power adjustment amount related to the number of bits per unit PUCCH, which is specifically determined based on the number of bits occupied per unit symbol or the number of bits occupied per unit bandwidth; and $g_{b,f,c}(i,l)$ represents the amount of power in different power control states.

Specifically, the foregoing $g_{b,f,c}(i,l)$ can be calculated through the following formula:

$$g_{b,f,c}(i, l) = g_{b,f,c}(i - i_0, l) + \sum_{m=0}^{C(C_i)-1} \delta_{PUCCH,b,f,c}(m, l), \text{ where}$$

l represents the power control state, $\delta_{PUCCH,b,f,c}(i,l)$ represents the accumulated TPC power amount, m is an integer between 0 and i, and $c(C_i)-1$ is used to represent the base number of power accumulated value from the time when a specified PUCCH repetition power command value is transmitted to the time when the transmission ends in a cell.

In this embodiment, since the corresponding PUCCH resource and the corresponding at least two pieces of power control information (that is, at least two groups of power control parameters) are activated through the third signaling indication, or the specific power control information switching method can be indicated by the first indication information, power control information switching occurs in the PUCCH repetitions corresponding to the PUCCH resource. In addition, each time the power control information switches, $PL_{b,f,c}(q_d)$ and/or the value of i in the formula will change, which causes a change in the overall PUCCH power value, affecting the behavior of joint channel estimation. Even if the transmission is performed using the same beam and TPC commands do not take effect within the time domain window, the power consistency and phase continuity of PUCCH repetitions will still change. Therefore, in this case, it is necessary to adjust the window starting behavior of the terminal based on this target event that breaks the power consistency and phase continuity, for example, closing the current second time domain window and starting a new second time domain window.

Optionally, the method for determining a time domain window further includes:

receiving, by the terminal, first indication information; and determining, by the terminal, the number N of target uplink channel repetitions based on the first indication information, where the terminal changes the power control information once every N target uplink channel transmissions, N being an integer greater than or equal to 1.

In an implementation, the foregoing first indication information is used to indicate the terminal to change the power control information once every N PUCCH transmissions performed in the PUCCH repetitions. The first indication information may be carried in the foregoing third signaling; or the first indication information may be carried in other signaling or messages different from the third signaling. This is not specifically limited herein.

For example, as shown in FIG. 4, through the third signaling, the network-side device can configure that power control information A and power control information B can be used in PUCCH repetitions. In this case, if N is equal to 2, the terminal uses power control information A for the 1st and 2nd PUCCH transmissions, and uses power control information B for the 3rd and 4th PUCCH transmissions.

For another example, as shown in FIG. 5 or FIG. 6, through the third signaling, the network-side device can configure that power control information A and power control information B can be used in PUCCH repetitions. In this case, if N is equal to 1, the terminal uses power control information A for the 1st PUCCH transmission, uses power control information B for the 2nd PUCCH transmission, uses power control information A for the 3rd PUCCH transmission, and so on.

In some embodiments, the first indication information includes a mapping pattern configured by the network-side device, the mapping pattern being in one-to-one correspondence with N.

In an implementation, the mapping pattern may include a sequential mode and a cyclic mode. In the sequential mode, the mapping pattern changes every two transmissions. Thus, the power control information corresponding to the mapping pattern also changes every two transmissions, that is, N is equal to 2. For example, as shown in FIG. 4, the terminal changes the power control information once every two PUCCH transmissions performed in the PUCCH repetitions.

Besides, in the cyclic mode, the mapping pattern changes for every transmission. Thus, the power control information corresponding to the mapping pattern also changes for every transmission, that is, N is equal to 1. For example, as shown in FIG. 5 or FIG. 6, the terminal changes the power control information once for every PUCCH transmission performed in the PUCCH repetitions.

In other embodiments, the foregoing mapping pattern may also be in one-to-one correspondence with the power control information, and the change of the mapping pattern can also be used to control the change of the power control information. Details are not described herein.

It should be noted that in addition to indicating the power control information switching method through the foregoing first indication information, the switching method of the at least two pieces of power control information indicated by the third signaling may also be determined in other ways such as protocol pre-agreement or default switching methods. This is not specifically limited herein.

It should be noted that changes in power control information may be implemented using one or at least two of the following methods:

modifying power control parameters, such as closed-loop power control state value (ClosedLoopIndex), PUCCH power control state information index p0-PUCCH-Id, and PUCCH path loss reference signal index PUCCH-PathlossReferenceRS-Id.

In this embodiment, the switching frequency of power control information may be adjusted by configuring the mapping pattern.

In an optional embodiment, the terminal does not expect N to be equal to 1.

In an implementation, that the terminal does not expect N to be equal to 1 can be understood as: the terminal does not expect the power control information to change for every PUCCH transmission performed in PUCCH repetitions, but expects that the power control information changes once for every at least two PUCCH transmissions.

In other words, compared with the transmission methods shown in FIGS. 5 and 6, the terminal prefers to perform the PUCCH repetition using the transmission method shown in FIG. 4, which can improve the gain of the actual time domain window.

It should be noted that in an implementation, after the terminal determines that it does not expect N to be equal to 1, the terminal still switches the power control information based on the value of N in the first indication information provided by the network-side device. For example, assuming that the terminal does not expect N to be equal to 1, but the value of N carried in the first indication information transmitted by the network-side device to the terminal is 1, the terminal still changes the power control information every time one PUCCH transmission is performed; or the terminal can report expectation information so that the network-side device can configure the value of N based on the expectation information of the terminal. This is not specifically limited herein.

In an optional embodiment, the determining, by a terminal, a second time domain window in a first time domain window based on first information includes:

after the terminal is enabled to start the time domain window or restart the time domain window, if N is equal to 1, expecting, by the terminal, not to start a new second time domain window in the first time domain window.

After the terminal is enabled to start the time domain window or restart the time domain window, the terminal can start the 1st second time domain window by default, and close the second time domain window based on the occurrence of a target event. In this embodiment, after the terminal closes the second time domain window, if N is equal to 1, the terminal expects not to start a new second time domain window in the first time domain window.

N being equal to 1 can be understood as: the terminal changes the power control information every time it performs one PUCCH transmission. In this case, if a new second time domain window is started, the second time domain window can only last for the duration of one PUCCH transmission, which will result in unnecessary signaling overheads and resource consumption related to starting the new second time domain window by the terminal.

In other words, in the case of N being equal to 1, compared with the transmission method shown in FIG. 5, the terminal prefers to perform the PUCCH repetition using the transmission method shown in FIG. 6.

In this embodiment, in a case that the terminal knows that N is equal to 1, the terminal will not start a new second time domain window, so that signaling overheads and resource consumption can be reduced.

It should be noted that in practical application scenarios, even if the terminal does not expect to start a new second time domain window in the first time domain window, the terminal may still restart a second time domain window based on actual requirements, which does not constitute a specific limitation herein.

In the embodiments of this application, the terminal determines the second time domain window in the first time domain window based on the first information; where the terminal maintains the first transmission characteristic in the second time domain window for target uplink channel repetitions; the first information includes power control information used for each target uplink channel transmission in the target uplink channel repetitions; the first time domain window is a nominal time domain window configured by a network-side device; and the first transmission characteristic is a transmission characteristic with consistent power and continuous phase. In a case that the power control information used for PUCCH transmission in PUCCH repetitions changes, the terminal can determine the second time domain window in the first time domain window based on this change. For example, after the power control information changes, the second time domain window for continuous transmission based on the first transmission characteristic is restarted. This allows PUCCH repetitions to adapt to occasions where power control information used for PUCCH transmission changes. Thus, the reliability of PUCCH repetitions can be improved through changes in power control information. In addition, this allows for effective utilization of joint channel estimation, thereby enhancing the performance of PUCCH repetition effectively.

The method for determining a time domain window provided in the embodiments of this application may be executed by an apparatus for determining a time domain window. In the embodiments of this application, the apparatus for determining a time domain window provided in the embodiments of this application is described by using the method for determining a time domain window being executed by the apparatus for determining a time domain window as an example.

Figure 7:
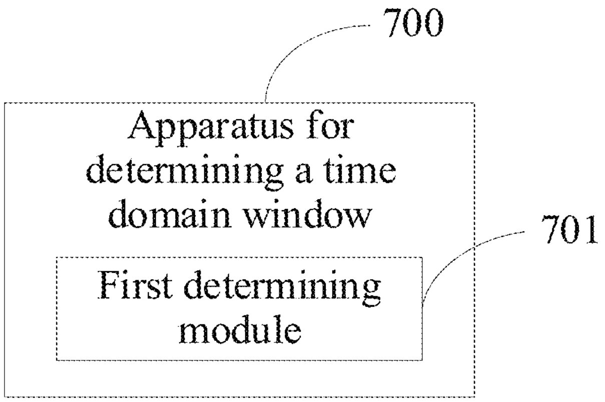
FIG. 7 is a schematic structural diagram of an apparatus for determining a time domain window according to an embodiment of this application.

Refer to FIG. 7. An apparatus for determining a time domain window provided in an embodiment of this application may be applied to a terminal. As shown in FIG. 7, the apparatus 700 for determining a time domain window may include the following modules:

a first determining module 701, configured to determine a second time domain window in a first time domain window based on first information; where the terminal maintains a first transmission characteristic in the second time domain window for target uplink channel repetitions;

the first information includes power control information used for each target uplink channel transmission in the target uplink channel repetitions;

the first time domain window is a nominal time domain window configured by a network-side device; and the first transmission characteristic is a transmission characteristic with consistent power and continuous phase.

Optionally, the target uplink channel repetitions include a first target uplink channel transmission and a second target uplink channel transmission; and the first determining module 701 is specifically configured to:

in a case that power control information corresponding to the first target uplink channel transmission is different from power control information corresponding to the second target uplink channel transmission, determine that a target event has occurred, and determine the second time domain window in the first time domain window based on the occurrence of the target event, where the target event means that the terminal is unable to maintain the first transmission characteristic.

Optionally, the first determining module 701 is specifically configured to perform at least one of the following:

determining to close the second time domain window corresponding to the first target uplink channel transmission; and determining to start the second time domain window corresponding to the second target uplink channel transmission; or determining not to start a new second time domain window in the first time domain window.

Optionally, the first determining module 701 is specifically configured to:

in a case that capability information of the terminal supports starting a new time domain window and/or the terminal has received first signaling, close the second time domain window corresponding to the first target uplink channel transmission, and start a new second time domain window at a position of the 1st symbol of the 1st target uplink channel transmission following the occurrence of the target event, where the first signaling is used to enable the terminal to start a new time domain window;

in a case that capability information of the terminal does not support starting a new time domain window and/or the terminal has received second signaling, close the second time domain window corresponding to the first target uplink channel transmission, and skip starting a new second time domain window in the first time domain window, where the second signaling is used to disable the terminal from starting a new time domain window;

close the second time domain window corresponding to the first target uplink channel transmission, and start a new second time domain window at a position of the 1st symbol of the 1 st target uplink channel transmission following the occurrence of the target event; or close the second time domain window corresponding to the first target uplink channel transmission, and skip starting a new second time domain window in the first time domain window.

Optionally, the target uplink channel includes a physical uplink control channel PUCCH or a physical uplink shared channel PUSCH.

Optionally, in a case that the target uplink channel includes the PUCCH channel, the power control information includes at least one of the following:

closed loop power control state value ClosedLoopIndex;

power control state information index p0-PUCCH-Id of the PUCCH channel; and path loss reference signal index PUCCH-PathlossReferenceRS-Id of the PUCCH channel.

Optionally, the apparatus 700 for determining a time domain window further includes:

a first receiving module, configured to receive third signaling, where the third signaling is used to configure or indicate a target PUCCH resource and at least two pieces of power control information.

Optionally, the third signaling includes at least one of the following: RRC signaling, media access control control element MAC CE signaling, and downlink control information DCI signaling.

Optionally, the apparatus 700 for determining a time domain window further includes:

a second receiving module, configured to receive first indication information; and a second determining module, configured to determine the number N of target uplink channel repetitions based on the first indication information, where the terminal changes the power control information once every N target uplink channel transmissions, N being an integer greater than or equal to 1.

Optionally, the first indication information includes a mapping pattern configured by the network-side device, the mapping pattern being in one-to-one correspondence with N.

Optionally, the terminal does not expect N to be equal to 1.

Optionally, the first determining module 701 is specifically configured to:

after the terminal is enabled to start the time domain window or restart the time domain window, if N is equal to 1, determine that the terminal expects not to start a new second time domain window in the first time domain window.

The apparatus for determining a time domain window in the embodiments of this application may be an electronic device, for example, an electronic device having an operating system, or may be a component of an electronic device, for example, an integrated circuit or a chip. The electronic device may be a terminal or a device other than terminals. For example, the terminal may include but is not limited to the types of the terminal 11 listed above, and the other devices may be servers, network attached storage (NAS), or the like, which are not specifically limited in the embodiments of this application.

The apparatus for determining a time domain window provided in this embodiment of this application can implement the processes implemented by the method embodiment shown in FIG. 3, with the same technical effects achieved. To avoid repetition, details are not described herein again.

Figure 8:
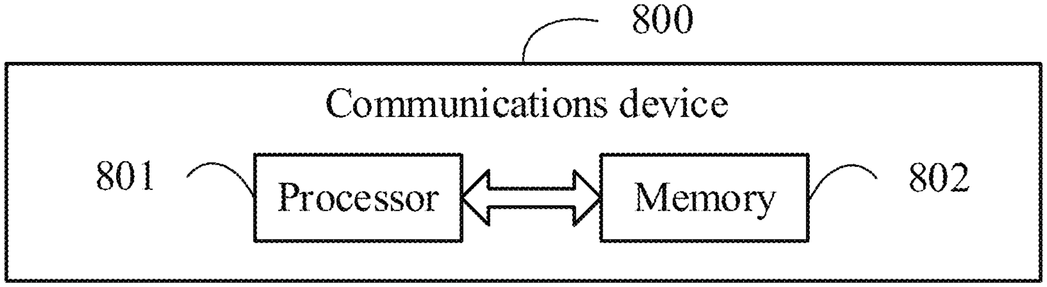
FIG. 8 is a schematic structural diagram of a communications device according to an embodiment of this application.

Optionally, as shown in FIG. 8, an embodiment of this application further provides a communications device 800 including a processor 801 and a memory 802. The memory 802 stores a program or instructions capable of running on the processor 801. For example, in a case that the communications device 800 is a terminal, when the program or instructions are executed by the processor 801, the steps of the foregoing embodiment of the method for determining a time domain window are implemented, with the same technical effects achieved. In a case that the communications device 800 is a network-side device, when the program or instructions are executed by the processor 801, the steps of the foregoing embodiment of the method for determining a time domain widow are implemented, with the same technical effects achieved. To avoid repetition, details are not described herein again.

An embodiment of this application further provides a terminal including a processor and a communication interface, where the processor is configured to determine a second time domain window in a first time domain window based on first information, where the terminal maintains a first transmission characteristic in the second time domain window for target uplink channel repetitions;

the first information includes power control information used for each target uplink channel transmission in the target uplink channel repetitions;

the first time domain window is a nominal time domain window configured by a network-side device; and the first transmission characteristic is a transmission characteristic with consistent power and continuous phase.

Figure 9:
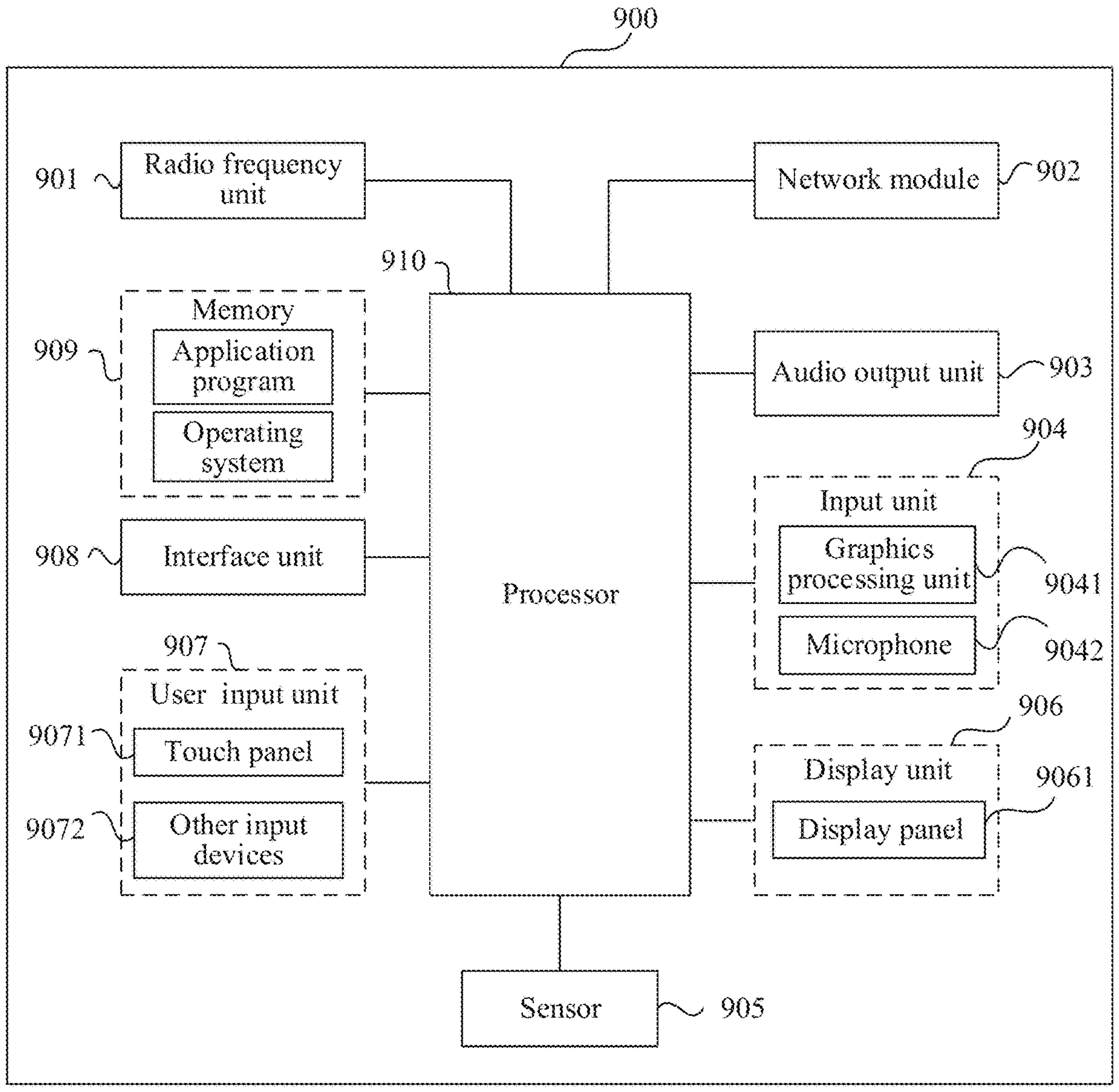
FIG. 9 is a schematic structural diagram of a terminal according to an embodiment of this application.

This terminal embodiment corresponds to the foregoing method embodiment on the terminal side. All processes and implementations in the foregoing method embodiment are applicable to this terminal embodiment, with the same technical effects achieved. Specifically, FIG. 9 is a schematic diagram of a hardware structure of a terminal implementing the embodiments of this application.

The terminal 900 includes but is not limited to at least some of components such as a radio frequency unit 901, a network module 902, an audio output unit 903, an input unit 904, a sensor 905, a display unit 906, a user input unit 907, an interface unit 908, a memory 909, and a processor 910.

It can be understood by those skilled in the art that the terminal 900 may further include a power supply (for example, battery) supplying power to the components. The power supply may be logically connected to the processor 910 via a power management system, so that functions such as charge management, discharge management, and power consumption management are implemented via the power management system. The structure of the terminal shown in FIG. 9 does not constitute any limitation on the terminal, and the terminal may include more or fewer components than shown in the figure, or combine some of the components, or have different arrangements of the components. Details are not described herein.

It should be understood that the input unit 904 may include a graphics processing unit (GPU) 9041 and a microphone 9042. The graphics processing unit 9041 processes image data of still pictures or videos that are obtained by an image capture apparatus (for example, camera) in an image or video capture mode. The display unit 906 may include a display panel 9061. The display panel 9061 may be configured in a form of a liquid crystal display, an organic light-emitting diode display, or the like. The user input unit 907 includes at least one of a touch panel 9071 and other input devices 9072. The touch panel 9071 is also referred to as a touchscreen. The touch panel 9071 may include two parts: a touch detection apparatus and a touch controller. Specifically, the other input devices 9072 may include but are not limited to a physical keyboard, a function button (for example, volume control button or on/off button), a trackball, a mouse, and a joystick. Details are not described herein.

In an embodiment of this application, the radio frequency unit 901 receives downlink data from a network-side device and transfers the data to the processor 910 for processing; and the radio frequency unit 901 can additionally send uplink data to the network-side device. Generally, the radio frequency unit 901 includes but is not limited to an antenna, an amplifier, a transceiver, a coupler, a low noise amplifier, a duplexer, and the like.

The memory 909 may be configured to store software programs or instructions and various data. The memory 909 may include a first storage for storing programs or instructions and a second storage area for storing data. The first storage area may store an operating system, an application program or instructions required by at least one function (for example, a sound play function or an image play function), and the like. In addition, the memory 909 may include a volatile memory or a non-volatile memory, or the memory 909 may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch link DRAM, SLDRAM), and a direct rambus random access memory (Direct Rambus RAM, DRRAM). The memory 909 of the embodiments of this application includes but is not limited to these and any other applicable types of memories.

The processor 910 may include one or more processing units. Optionally, the processor 910 may integrate an application processor and a modem processor. The application processor primarily processes operations involving an operating system, user interface, application program, or the like. The modem processor primarily processes radio communication signals, for example, being a baseband processor. It can be understood that a modem processor may alternatively skip being integrated in the processor 910.

The processor 910 is configured to determine a second time domain window in a first time domain window based on first information; where the terminal maintains a first transmission characteristic in the second time domain window for target uplink channel repetitions;

the first information includes power control information used for each target uplink channel transmission in the target uplink channel repetitions;

the first time domain window is a nominal time domain window configured by a network-side device; and the first transmission characteristic is a transmission characteristic with consistent power and continuous phase.

Optionally, the target uplink channel repetitions include a first target uplink channel transmission and a second target uplink channel transmission. The determining, by the processor 910, a second time domain window in a first time domain window based on first information includes:

in a case that power control information corresponding to the first target uplink channel transmission is different from power control information corresponding to the second target uplink channel transmission, determining that a target event has occurred, where the target event means that the terminal is unable to maintain the first transmission characteristic; and determining the second time domain window in the first time domain window based on the occurrence of the target event.

Optionally, the determining, by the processor 910, the second time domain window in the first time domain window includes at least one of the following:

determining to close the second time domain window corresponding to the first target uplink channel transmission; and determining to start the second time domain window corresponding to the second target uplink channel transmission; or determining not to start a new second time domain window in the first time domain window.

Optionally, the determining, by the processor 910, to start the second time domain window corresponding to the second target uplink channel transmission; or determining not to start a new second time domain window in the first time domain window includes:

in a case that capability information of the terminal supports starting a new time domain window and/or the terminal has received first signaling, closing the second time domain window corresponding to the first target uplink channel transmission, and starting a new second time domain window at a position of the 1st symbol of the 1st target uplink channel transmission following the occurrence of the target event, where the first signaling is used to enable the terminal to start a new time domain window;

in a case that capability information of the terminal does not support starting a new time domain window and/or the terminal has received second signaling, closing the second time domain window corresponding to the first target uplink channel transmission, and skipping starting a new second time domain window in the first time domain window, where the second signaling is used to disable the terminal from starting a new time domain window;

closing the second time domain window corresponding to the first target uplink channel transmission, and starting a new second time domain window at a position of the 1st symbol of the 1st target uplink channel transmission following the occurrence of the target event; or closing the second time domain window corresponding to the first target uplink channel transmission, and skipping starting a new second time domain window in the first time domain window.

Optionally, the target uplink channel includes a physical uplink control channel PUCCH or a physical uplink shared channel PUSCH.

Optionally, in a case that the target uplink channel includes the PUCCH channel, the power control information includes at least one of the following:

closed loop power control state value ClosedLoopIndex;

power control state information index p0-PUCCH-Id of the PUCCH channel; and path loss reference signal index PUCCH-PathlossReferenceRS-Id of the PUCCH channel.

Optionally, before the processor 910 performs the determining a second time domain window in a first time domain window based on first information, the radio frequency unit 901 is further configured to:

receive third signaling, where the third signaling is used to configure or indicate a target PUCCH resource and at least two pieces of power control information.

Optionally, the third signaling includes at least one of the following: RRC signaling, media access control control element MAC CE signaling, and downlink control information DCI signaling.

Optionally, the radio frequency unit 901 is further configured to receive first indication information.

The processor 910 is further configured to determine the number N of target uplink channel repetitions based on the first indication information, where the terminal changes the power control information once every N target uplink channel transmissions, N being an integer greater than or equal to 1.

Optionally, the first indication information includes a mapping pattern configured by the network-side device, the mapping pattern being in one-to-one correspondence with N.

Optionally, the terminal does not expect N to be equal to 1.

Optionally, the determining, by the processor 910, a second time domain window in a first time domain window based on first information includes:

after the terminal is enabled to start the time domain window or restart the time domain window, if N is equal to 1, determining that the terminal expects not to start a new second time domain window in the first time domain window.

The terminal 900 provided in this embodiment of this application can execute the method executed by the modules shown in FIG. 7, with the same technical effects achieved. To avoid repetition, details are not described herein again.

An embodiment of this application further provides a readable storage medium. The readable storage medium stores a program or instructions. When the program or instructions are executed by a processor, each process of the foregoing method embodiment for determining a time domain window is implemented, with the same technical effects achieved. To avoid repetition, details are not described herein again.

The processor is a processor in the terminal described in the foregoing embodiment. The readable storage medium includes a computer-readable storage medium such as a computer read-only memory ROM, a random access memory RAM, a magnetic disk, or an optical disc.

An embodiment of this application further provides a chip. The chip includes a processor and a communication interface. The communication interface is coupled to the processor. The processor is configured to run a program or instructions to implement each process of the foregoing method embodiment for determining a time domain window, with the same technical effects achieved. To avoid repetition, details are not described herein again.

It should be understood that the chip mentioned in an embodiment of this application may also be referred to as a system-level chip, a system chip, a chip system, a system-on-chip, or the like.

An embodiment of this application further provides a computer program product, where the computer program product is stored in a storage medium, and the computer program product is executed by at least one processor to implement each process of the foregoing method embodiment for determining a time domain window, with the same technical effects achieved. To avoid repetition, details are not described herein again.

It should be noted that in this specification, the terms “include” and “comprise”, or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by “includes a . . . ” does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

Based on the above description of embodiments, persons skilled in the art can clearly understand that the method in the foregoing embodiments can be implemented through software on a necessary hardware platform or certainly through hardware only, but in many cases, the former is the more preferred implementation. Based on such an understanding, the technical solutions of this application essentially or the part contributing to the prior art may be implemented in a form of a computer software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for determining a time domain window, comprising:

determining, by a terminal, a second time domain window in a first time domain window based on first information; wherein the terminal maintains a first transmission characteristic in the second time domain window for target uplink channel repetitions;

the first information comprises power control information used for each target uplink channel transmission in the target uplink channel repetitions;

the first time domain window is a nominal time domain window configured by a network-side device; and the first transmission characteristic is a transmission characteristic with consistent power and continuous phase, wherein the target uplink channel comprises a physical uplink control channel (PUCCH) channel, the power control information comprises at least one of the following:

closed loop power control state value ClosedLoopIndex;

power control state information index p0-PUCCH-Id of the PUCCH channel; or path loss reference signal index PUCCH-PathlossReferenceRS-Id of the PUCCH channel;

wherein before the determining, by a terminal, a second time domain window in a first time domain window based on first information, the method further comprises:

receiving, by the terminal, third signaling, wherein the third signaling is used to configure or indicate a target PUCCH resource and at least two pieces of power control information.

2. The method according to claim 1, wherein the target uplink channel repetitions comprise a first target uplink channel transmission and a second target uplink channel transmission; and the determining, by a terminal, a second time domain window in a first time domain window based on first information comprises:

in a case that power control information corresponding to the first target uplink channel transmission is different from power control information corresponding to the second target uplink channel transmission, determining, by the terminal, that a target event has occurred, wherein the target event means that the terminal is unable to maintain the first transmission characteristic; and determining, by the terminal, the second time domain window in the first time domain window based on the occurrence of the target event.

3. The method according to claim 2, wherein the determining, by the terminal, the second time domain window in the first time domain window comprises at least one of the following:

determining, by the terminal, to close the second time domain window corresponding to the first target uplink channel transmission; or determining, by the terminal, to start the second time domain window corresponding to the second target uplink channel transmission; or determining, by the terminal, not to start a new second time domain window in the first time domain window.

4. The method according to claim 3, wherein the determining, by the terminal, to start the second time domain window corresponding to the second target uplink channel transmission; or determining, by the terminal, not to start a new second time domain window in the first time domain window comprises:

in a case that capability information of the terminal supports starting a new time domain window and/or the terminal has received first signaling, closing, by the terminal, the second time domain window corresponding to the first target uplink channel transmission, and starting a new second time domain window at a position of the 1st symbol of the 1st target uplink channel transmission following the occurrence of the target event, wherein the first signaling is used to enable the terminal to start a new time domain window;

in a case that capability information of the terminal does not support starting a new time domain window and/or the terminal has received second signaling, closing, by the terminal, the second time domain window corresponding to the first target uplink channel transmission, and skipping starting a new second time domain window in the first time domain window, wherein the second signaling is used to disable the terminal from starting a new time domain window;

closing, by the terminal, the second time domain window corresponding to the first target uplink channel transmission, and starting a new second time domain window at a position of the 1st symbol of the 1st target uplink channel transmission following the occurrence of the target event; or closing, by the terminal, the second time domain window corresponding to the first target uplink channel transmission, and skipping starting a new second time domain window in the first time domain window.

5. The method according to claim 1, wherein the target uplink channel further comprises a physical uplink shared channel (PUSCH).

6. The method according to claim 1, wherein the third signaling comprises at least one of the following: RRC signaling, media access control control element (MAC CE) signaling, or downlink control information (DCI) signaling.

7. The method according to claim 1, wherein the method further comprises:

receiving, by the terminal, first indication information; and determining, by the terminal, the number N of target uplink channel repetitions based on the first indication information, wherein the terminal changes the power control information once every N target uplink channel transmissions, N being an integer greater than or equal to 1.

8. The method according to claim 7, wherein the first indication information comprises a mapping pattern configured by the network-side device, the mapping pattern being in one-to-one correspondence with N.

9. The method according to claim 1, wherein the target uplink channel repetitions are repetitions on multiple transmission reception points (TRPs).

10. A terminal, comprising a processor and a memory, wherein the memory stores a program or instructions capable of running on the processor, wherein the program or instructions, when executed by the processor, causes the terminal to perform:

determining a second time domain window in a first time domain window based on first information; wherein the terminal maintains a first transmission characteristic in the second time domain window for target uplink channel repetitions;

the first information comprises power control information used for each target uplink channel transmission in the target uplink channel repetitions;

the first time domain window is a nominal time domain window configured by a network-side device; and the first transmission characteristic is a transmission characteristic with consistent power and continuous phase, wherein the target uplink channel comprises a physical uplink control channel (PUCCH) channel, the power control information comprises at least one of the following:

closed loop power control state value ClosedLoopIndex;

power control state information index p0-PUCCH-Id of the PUCCH channel; or path loss reference signal index PUCCH-PathlossReferenceRS-Id of the PUCCH channel;

wherein before the determining a second time domain window in a first time domain window based on first information, the program or instructions, when executed by the processor, causes the terminal to perform:

receiving third signaling, wherein the third signaling is used to configure or indicate a target PUCCH resource and at least two pieces of power control information.

11. The terminal according to claim 10, wherein the target uplink channel repetitions comprise a first target uplink channel transmission and a second target uplink channel transmission; and when determining a second time domain window in a first time domain window based on first information, the program or instructions, when executed by the processor, causes the terminal to perform:

in a case that power control information corresponding to the first target uplink channel transmission is different from power control information corresponding to the second target uplink channel transmission, determining that a target event has occurred, wherein the target event means that the terminal is unable to maintain the first transmission characteristic; and determining the second time domain window in the first time domain window based on the occurrence of the target event.

12. The terminal according to claim 11, wherein when determining the second time domain window in the first time domain window, the program or instructions, when executed by the processor, causes the terminal to perform at least one of the following:

determining to close the second time domain window corresponding to the first target uplink channel transmission; or determining to start the second time domain window corresponding to the second target uplink channel transmission; or determining not to start a new second time domain window in the first time domain window.

13. The terminal according to claim 12, wherein when determining to start the second time domain window corresponding to the second target uplink channel transmission, or when determining not to start a new second time domain window in the first time domain window, the program or instructions, when executed by the processor, causes the terminal to perform:

in a case that capability information of the terminal supports starting a new time domain window and/or the terminal has received first signaling, closing the second time domain window corresponding to the first target uplink channel transmission, and starting a new second time domain window at a position of the 1st symbol of the 1st target uplink channel transmission following the occurrence of the target event, wherein the first signaling is used to enable the terminal to start a new time domain window;

in a case that capability information of the terminal does not support starting a new time domain window and/or the terminal has received second signaling, closing the second time domain window corresponding to the first target uplink channel transmission, and skipping starting a new second time domain window in the first time domain window, wherein the second signaling is used to disable the terminal from starting a new time domain window;

closing the second time domain window corresponding to the first target uplink channel transmission, and starting a new second time domain window at a position of the 1st symbol of the 1 st target uplink channel transmission following the occurrence of the target event; or closing the second time domain window corresponding to the first target uplink channel transmission, and skipping starting a new second time domain window in the first time domain window.

14. The terminal according to claim 10, wherein the target uplink channel further comprises a physical uplink shared channel (PUSCH).

15. The terminal according to claim 10, wherein the third signaling comprises at least one of the following: RRC signaling, media access control control element (MAC CE) signaling, or downlink control information (DCI) signaling.

16. A chip, wherein the chip comprises a processor and a communications interface, wherein the communications interface is coupled to the processor, and the processor is configured to run a program or an instruction to perform:

determining a second time domain window in a first time domain window based on first information; wherein a terminal maintains a first transmission characteristic in the second time domain window for target uplink channel repetitions;

the first information comprises power control information used for each target uplink channel transmission in the target uplink channel repetitions;

the first time domain window is a nominal time domain window configured by a network-side device; and the first transmission characteristic is a transmission characteristic with consistent power and continuous phase, wherein the target uplink channel comprises a physical uplink control channel (PUCCH) channel, the power control information comprises at least one of the following:

closed loop power control state value ClosedLoopIndex;

power control state information index p0-PUCCH-Id of the PUCCH channel; or path loss reference signal index PUCCH-PathlossReferenceRS-Id of the PUCCH channel;

wherein before the determining a second time domain window in a first time domain window based on first information, the processor is configured to run a program or an instruction to perform:

receiving third signaling, wherein the third signaling is used to configure or indicate a target PUCCH resource and at least two pieces of power control information.

* * * * *